US009858764B2

(12) United States Patent
Maggio

(10) Patent No.: US 9,858,764 B2
(45) Date of Patent: Jan. 2, 2018

(54) METHOD AND SYSTEM FOR DEPLOYMENT OF STANDALONE AND REACTIVE SQUARES GAMES

(71) Applicant: Frank S. Maggio, Pinellas Park, FL (US)

(72) Inventor: Frank S. Maggio, Pinellas Park, FL (US)

( * ) Notice: Subject to any disclaimer, the term of this patent is extended or adjusted under 35 U.S.C. 154(b) by 181 days.

(21) Appl. No.: 14/852,477

(22) Filed: Sep. 11, 2015

(65) Prior Publication Data

US 2016/0078729 A1 Mar. 17, 2016

Related U.S. Application Data

(60) Provisional application No. 62/049,329, filed on Sep. 11, 2014, provisional application No. 62/051,931, filed on Sep. 17, 2014.

(51) Int. Cl.
*A63F 13/00* (2014.01)
*G07F 17/32* (2006.01)

(52) U.S. Cl.
CPC ................................ *G07F 17/3288* (2013.01)

(58) Field of Classification Search
CPC ......................... G07F 17/3288; G07F 17/3295
USPC ........................................................... 463/17
See application file for complete search history.

(56) References Cited

U.S. PATENT DOCUMENTS

2007/0102877 A1* 5/2007 Personius ............... G07F 17/32 273/138.2
2007/0270202 A1* 11/2007 Vostoris ......................... 463/16
2009/0005165 A1* 1/2009 Arezina .............. G07F 17/3244 463/37
2014/0274332 A1* 9/2014 Carlin ................. G07F 17/3244 463/25
2015/0080124 A1* 3/2015 Andersen ............ G07F 17/3288 463/31
2015/0179021 A1* 6/2015 Alexander .......... G07F 17/3272 463/22
2015/0325085 A1* 11/2015 O'Hagan ................. A63F 9/24 463/16

* cited by examiner

*Primary Examiner* — Allen Chan
(74) *Attorney, Agent, or Firm* — Daniel A. Tanner, III

(57) ABSTRACT

A system and method are provided for implementing a uniquely automated, and otherwise gamified, version of a Squares Game. The disclosed schemes incorporate technology for hosting on, or interacting/reacting with, potential participants' mobile and personal communicating and computing devices. The disclosed schemes simplify hosting of, and participation in, a unique implementation of a Squares Game associated with one or more live event, including but not limited to live sporting events. The disclosed schemes introduce a streamlined process for registering participants, selecting interior game squares, among many players, and executing all of the gaming functions in an automated manner to include identification and notification of winners when their winning numbers are determined to be associated with respective numbers in the live event.

16 Claims, 3 Drawing Sheets

METHOD AND SYSTEM FOR DEPLOYMENT OF STANDALONE AND REACTIVE SQUARES GAMES

This application claims priority to U.S. Provisional Patent Application No. 62/049,329 entitled "Method And System For Deployment Of Standalone And Reactive Sport-Related Game Squares Games" by Frank S. Maggio, filed in the U.S. Patent and Trademark Office on Sep. 11, 2014, and to U.S. Provisional Patent Application No. 62/051,931 entitled "Method And System For Deployment Variants Of Standalone And Reactive Sport-Related Game Squares Games" by Frank S. Maggio, filed in the U.S. Patent and Trademark Office on Sep. 17, 2014, the disclosures of which are hereby incorporated by reference herein in their entirety.

BACKGROUND

1. Field of the Disclosed Embodiments

This disclosure relates to systems and methods for uniquely automating and otherwise gamifying a Squares Game to incorporate technology, such as hosting on mobile and personal communicating and computing devices in a manner that (1) simplifies hosting and participation, and (2) introduces a streamlined process for, for example, selecting interior game squares, among many players, with application across many sporting events and sports types, with an objective of attracting high levels of potential consumer and/or customer traffic.

2. Related Art

In the week or weeks leading up to certain particularly noteworthy contests for national championships, or contests at the professional or collegiate level that are of particular note, if only to establish local "bragging" rights, certain wagering pools emerge in businesses, offices, sports bars, among friends and the like. In circumstances, there will be weekly pools for a particular team regardless of the opposition.

An extremely popular game played by sports fans, including attendees and viewers of particularly noteworthy football games, including what is commonly referred to as the Big Game, is the "Squares Game." FIG. 1 schematically illustrates a typical embodiment of a Squares Game matrix form 100. In popular embodiments, a ten by ten square matrix participation area 110 is hand-drawn or otherwise produced by a host. The host circulates the matrix form 100 among colleagues, associates, friends, co-workers, customers and the like soliciting their participation in the game. The matrix form 100 may include certain logos, other identifying information, contact data, instructions or other like inputs in, for example, a free form identifying field 160. The matrix form 100 may contain blank border fields 120,130 outside the ten by ten square matrix participation area 110, e.g., across the top (as show) or bottom, and down the left side (as shown) or right side, to be filled in when all of the hundred squares in the matrix participation area 110 have been selected by participants.

For the host, the process of soliciting participation in filling in the matrix participation area 110 by "selling" the squares, one square or a couple of squares at a time, can be a time-consuming and frustrating undertaking as enthusiasm for participation among a narrow population of participants with whom the host may be associated and/or interact ebbs and flows. Some of this burden on the host may be eased by "selling" the individual squares in pre-planned groups of four (as is indicated in FIG. 1 by the slightly heavier lines in the matrix participation area 110) as, for example, "super" squares.

After selling/filling all of the squares in the matrix participation area 110, the still blank border fields 120,130, may be filled in with "score heading" numbers in the manner shown in FIG. 1. These score heading numbers, in the context of a conventional football pool, corresponding to the final digit of each of the "Home" and "Away" (see elements 140,150) team scores for the game, or at intervals, e.g., by halves or by quarters, according to a pre-determined and pre-announced prize structure. The score heading numbers entered into the border fields 120,130 are typically randomly selected one at a time, and placed at the top or left of a column or row in the example shown in FIG. 1, respectively.

The letters A-Z (minus Q) will be described in view of the disclosed embodiments below.

Participants in Squares Games may, for example, pay $5 per square, for a total prize pool of $500. The collected sales proceeds from the Squares Game are then divided among the participants, typically based upon the score of the game at the pre-determined intervals. As examples, the score at the end of each quarter of a football game may garner the "winning" participant a 25% increment of the overall prize pool, or these scores may garner 20% increments for the first 3 quarters, and 40% for the end of game score. In some instances, the Squares Game host or organizer may retain a portion of the square sales proceeds, to offset a "cost" of managing the game. These games are generally informally administered among groups of friends and/or colleagues, and the "rules" are generally pre-briefed to all participants who then voluntarily agree to participate according to those rules.

SUMMARY OF THE DISCLOSED EMBODIMENTS

As is mentioned above there are many variations on this general theme and in the establishment of the matrix participation area 110 as shown in the exemplary embodiment illustrated in FIG. 1, all of which are pre-established and explained to the participants. Further, the concept although generally associated with football games may be adjusted and adaptable to other sports, in many unique ways.

With the proliferation of individual mobile communicating and computing devices, an opportunity exists to substantially automate a conventional Squares Game in a manner that increases user participation and interest and to incorporate participation in such games on a local, regional or broader scope into an overall reactive advertising scheme in which participants may be rewarded, not only for their participation in a particular game, but more broadly for their participation in a reactive advertising environment overall.

In view of the above background, it may be advantageous to find some manner by which to automate a conventional Squares Game in a manner that achieves the above advanced objectives. In this regard, it may be particularly advantageous to provide programming for individual users' mobile communicating and computing ("smart") devices that may facilitate their employment to rewarding, challenging and interesting automated gamification of, and reactive advertising associated with, a Squares Game. An objective may be to employ the automated Squares Game as an entry into a reactive advertising scheme thereby generating, or otherwise stimulating, a new degree of interest in integrated commercial and advertising content.

Exemplary embodiments of the systems and methods according to this disclosure may provide unique automation of a Squares Game for participation across a broader spectrum of a participant population.

Exemplary embodiments may implement automated schemes that are directed at overcoming the burden of hosting a local Squares Game in a limited participant population environment.

Exemplary embodiments may ease the logistical burden on any host of a Squares Game in at least one of automating the selling of the squares, selecting of the numbers, and preparing of the finalized matrices to be automatically distributed to all participants prior to the event to which the Squares Game is linked.

Exemplary embodiments may distribute participation across a broader user population than simply the potential participants, e.g., 100 or so people, that the host knows.

Exemplary embodiments may verify receipt of the finalized matrices with all of the participants in order to ensure that attention remains high. It is recognized that some participants' interest in the particular sporting event with which a Squares Game may be associated is specifically increase based on their vested interest in the outcome of each prize distributing interval. Part of the allure of Squares Games is that they add excitement to sporting events, particularly when a favored team is not winning, or when the game is no longer close.

Exemplary embodiments may provide automated notifications to winners of particular Squares Games, all of whom will not be viewing the sporting event together.

Exemplary embodiments may execute an automated randomization scheme for selecting the numbers to fill the border areas in a manner that reduces any possibility for controversy with the host based on the ultimately selected numbering scheme.

Exemplary embodiments may collect participant information for recurring gaming or to separately solicit participation in reactive advertising that may be of interest to the participants based on the information that they provide These and other features, and advantages, of the disclosed systems and methods are described in, or apparent from, the following detailed description of various exemplary embodiments.

BRIEF DESCRIPTION OF THE DRAWINGS

Various exemplary embodiments of the systems and methods for uniquely automating and otherwise gamifying a Squares Game that incorporate technology, such as hosting on mobile and personal communicating and computing devices in a manner that simplifies hosting and participation, and that introduces a streamlined process for, for example, selecting interior game squares, among many players, with application across many sporting events and sports types, according to this disclosure, will be described, in detail, with reference to the following drawings, in which.

DETAILED DESCRIPTION OF EMBODIMENTS

Figure 1:
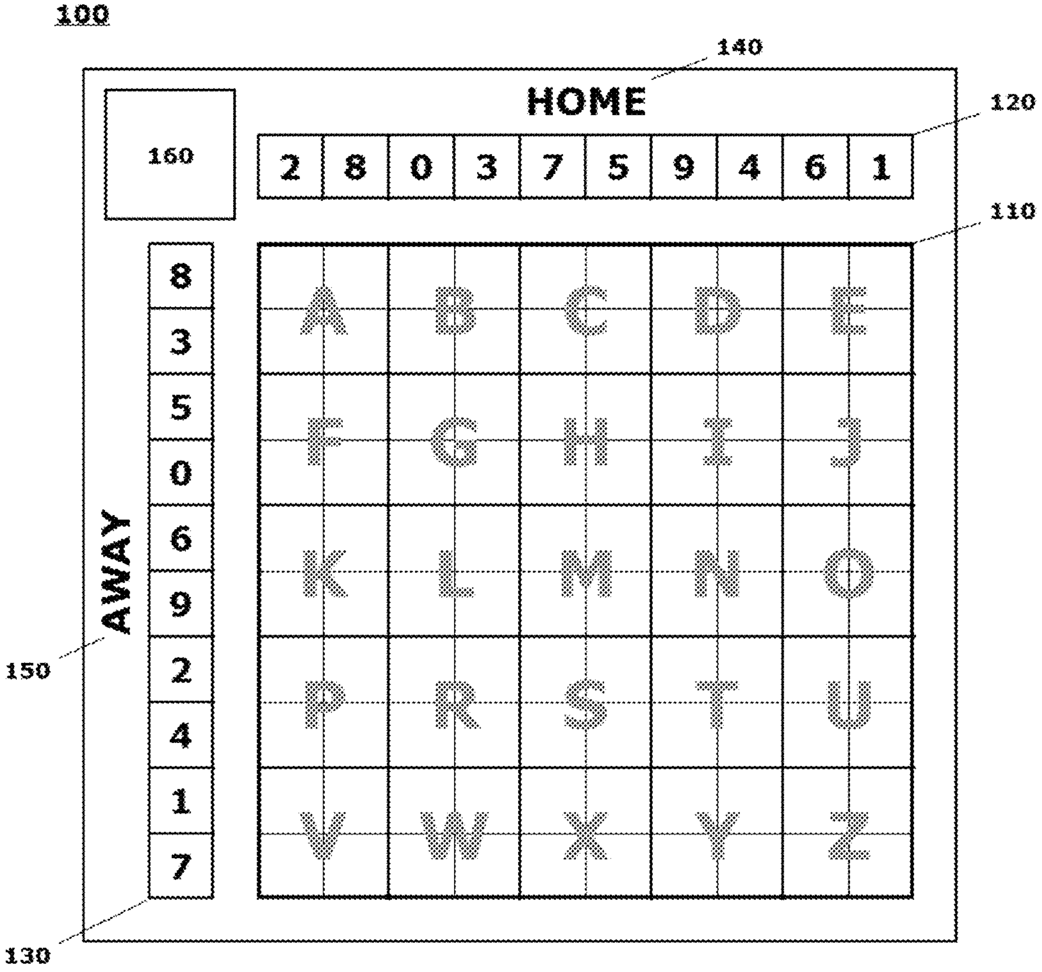
FIG. 1 schematically illustrates a typical embodiment of a Squares Game matrix form that may be automated according the disclosed schemes.

The systems and methods for uniquely automating and otherwise gamifying a Squares Game that incorporate technology, such as hosting on mobile and personal communicating and computing devices in a manner that simplifies hosting and participation, and that introduces a streamlined process for, for example, selecting interior game squares, among many players, with applications across many sporting events and sports types, according to this disclosure will generally refer to this specific utility for those systems and methods. Exemplary embodiments described and depicted in this disclosure should not be interpreted as being specifically limited to any particular physical configuration of a user mobile computing or communicating device or to any particular class of or protocol for, networked communication among devices of participating users. In fact, the disclosed systems and methods are not necessarily even restricted to user mobile devices. An electronic display component, which may display, for example, a matrix such as that shown in FIG. 1 may be usable to implement the disclosed schemes. Such display screens may include those associated with, for example, an Internet-based implementation accessed through a host website.

It should be recognized that any advantageous use of the systems and methods for gamifying a Squares Game and for providing the gamified Squares Games to a broad cross-section of a user population, in a manner that not only promotes participation in the games, but also provides for information exchange pursuant to immersion of a user in a reactive advertising scheme or environment that may benefit from processes, techniques or schemes such as those discussed in detail in this disclosure is contemplated as being included within the scope of the disclosed exemplary systems and methods.

The systems and methods according to this disclosure will be described as being particularly adaptable to enhancing a gamification experience related to randomized participation in a Squares Game related to one or more sporting events. The disclosed systems and methods may have the additional advantage of collecting demographic (and even personal) information regarding participants in a manner that provides an advertiser or marketer with a body of analyzable data regarding those the participants in order to target reactive advertising content at those participants. In this regard, an amount of Business Intelligence regarding a participant population may be collected and made available or otherwise provided for use. Specific references to gamification and information exchange schemes are meant to be illustrative only in providing examples of real-world utility for the disclosed systems and methods, and should not be considered as limiting the disclosed systems and methods to any particular product or combination of devices, or to any particular type of electronically or physically sharable data vehicle. In other words, any commonly-known user personal electronic, computing, communicating and/or data display component, whether substantially fixed, or easily mobile, may be incorporated into the overall scheme for automated gamification of the Squares Game.

In addition to the above-noted shortfalls in conventional Squares Games, those that have participated will readily recognize that certain score combinations (such as, for example, 2,2 or 5,2 in football games) are extremely infrequent winners of Squares Games. Historically, quarters and entire games of football infrequently end in scores that reflect these score combinations. Therefore, in traditional Square Games, holders of unfavorable score combinations receive little of the additional entertainment value, from the very beginning. The disclosed schemes may incorporate certain weighting or in process randomization schemes to be applied once the random numbers are chosen to better "level the playing field" in a manner that enhances participation for all participants even in the context of a single sporting event. For example, according to a pre-determined and pre-briefed schemes, periodically throughout the sporting event with which the Squares Game is associated, random number combinations may be shuffled, or in embodiments, separately selected for the reward of additional "prizes."

The disclosed schemes are intended to take Squares Games, which are infrequently hosted outside of the Big Game (one of the most widely viewed sporting events in the world every year), or are otherwise infrequently hosted by recurring basis due to their manually cumbersome nature, and provide a level of automation that may foster broader adoption of Squares Games over the balance of football games, and indeed across a more significant cross-section of other professional sports. A capacity of the disclosed schemes to reach a broader participating population may render the schemes more popular in their ability to attract many people without being tied, for example, to the restrictions of a closed viewing area among a controlled group in which a conventional host can most easily manually conduct, manage, play and/or oversee the Squares Game.

As will be described in greater detail below, the variability of the structure of the game application, including in-event re-randomization of the matrix may promote higher levels of participation, and continued interest for particular participants during an entirety of the sporting event with which the squares game is associated.

The disclosed schemes may prove particularly advantageous for many popular places where groups of fans congregate and consume sports (and food and beverages—potential advertisers for Squares Games), but which traditionally do not lend themselves easily to implementation of a manually-implemented Squares Game, because the participating environment is not necessarily lend itself to adequate oversight of the game play. Additionally, the disclosed schemes may prove particularly beneficial as additional incentives or "perks" at professional and collegiate sports venues in addition to sports bars, and, virtually any venue that may attract large viewing, including television viewing, audiences. In implementations, it is conceivable that tens of thousands of fans may enjoy participating in a plurality of individual device-implemented Squares Game. In this regard, viewership and participation may be beneficially increased as individuals may be naturally inclined and interested to play.

The disclosed schemes, therefore, may provide an easy and controlled manner by which to educate, aggregate and enable large numbers of simultaneous players, even on multiple Squares Games among a particular group of participants.

The disclosed schemes may implement the popular Squares Game to achieve the above objectives. Embodiments may provide an automated opportunity to invite participation in simultaneous Squares Games associated with one or more sporting events, which also may be occurring nearly simultaneously. Embodiments separately may provide an opportunity for a particular group to all participate in a same Squares Game in a manner that maintains the familiarity of playing the game among a group of friends, associates, colleagues, co-workers or the like. The disclosed schemes may provide the additional advantage that on occasions where the number of participants in a particular group is not enough to "fill" a particular matrix, other participants may be "allowed" into the particular game to maintain the fidelity of the game, the odds of any individual winning and the prize pool at requisite levels.

Based on the automated nature of the disclosed embodiments, these schemes may have particular other advantages over manual implementations in that, in embodiments, score combinations may be changeable among specified game periods within the Squares Game in a manner that provides heightened excitement to all, by enabling participants to avoid being left with unattractive score combinations for an entire duration of a particular sporting event.

A version of the disclosed Squares Games can include incentives to attract advertisers, who benefit from the attention paid to the Squares Games, and who can offset some or all of the costs of hosting and distributing the Squares Games.

The disclosed embodiments introduce technology to provide a practical manner by which to handle the distribution of Squares Game matrices, as well as providing a flexible process of selecting and assigning the squares, along with aiding to collect any entry fees, tracking the results, and distributing the prizes.

While the disclosed embodiments may incorporate components that apply to traditional ten by ten matrix games, it is anticipated that popular implementations may be found in the five by five matrix version denoted by the darker lines and the letter annotations shown in the matrix participation area 110 in FIG. 1. Such an implementation may be discussed below as a "Super Squares" variant of the game.

"Pre-game" Squares Game matrices could be shown in a central location, perhaps with URL's, unique letter designations, or QR codes inside of each square, which could allow users to enter a particular square's URL or unique letter into a web address or window of a supporting website or mobile application, or, a user could select a square by scanning QR codes (on a displayed Squares Game matrix), or click the square on a display, which would allow the user to select that particular square.

In embodiments, the disclosed process, as enabled by hosting Squares Games electronic devices, may provide formatting options. For example, instead of randomly filling out the ten column and row "score heading" sections with random number from 0-9, the score heading(s) could be fixed, and the internal 25 or 100 matrix squares could instead be "jumbled" once the entry phase of the game is closed, and selections are final. This would be virtually impossible to accomplish in a conventional paper environment, but is relatively easily implementable in a virtual environment.

Super Squares Games provide a method by which a mass audience can participate in Squares Games, hosted by a network, sports venue, team, advertiser, individual or ad sponsor. While traditional "sales" of squares may be enabled, it should be recognized that other "prize" schemes are implementable and may be preferable in certain jurisdictions and/or scenarios. Due, for example, to the considerable amount of luck (chance) required to win a game, and what is anticipated to become a very public nature of the game, it may be advisable, or even required in certain jurisdictions to avoid charging for participating, and instead to offer other incentives (rewards) for participation, including entries (squares) in exchange for participating in reactive or ad-supported versions of the game.

When participating in Super Squares Games, jumbo 4×4 squares are selected by players, five across horizontally and five up and down vertically (5×5), meaning that there are only 25 "Super Squares" to choose from, each representing 4 number combinations (4 times the number of score combos for participants, and 4 times fewer squares to sell/fill). Each Super Square can be lettered A-Y (25 letters) or A-Z (with one letter of 26, from A to Z, being deleted, or representing a choice that essentially asks that the matrix square be randomized. Using letters makes it simple to select and record a square choice, and to share one's choice with others as opposed to using the X and Y axis matrix address. In one version of a Super Squares Game, the host could remove the "I" or "Q," (the latter being shown in FIG. 1, to avoid the visual confusion of I with a number, or the letter "Q" with "O." Separately, the letter Q, in embodiments, may be sued to select a randomized "Quick Pick" of a Super Square. In such a Quick Pick digital environment, those that select "Q" could be randomly assigned a letter, either before or after other interior squares are completed and/or jumbled.

A known limitation of mobile phones is that a ten by ten annotated grid may be difficult to display and even more difficult to manipulate correctly on a small screen. If presented on a television or other larger format display screen, QR codes may be placed in each square. It is recognized that, in mobile screen applications, the QR codes could be too small or close together to be easily scanned without inadvertently scanning the wrong QR code. Therefore, a less error-prone method of allowing a user to select an interior square may be to refer to each square by a letter. A host could therefore utilize a lettering system to select a square ("Enter your letter HERE: __________") as opposed to requiring the participant to press a section of a screen or scan a too-small QR code, thus providing an entry option that may eliminate some complexity and errors that are more likely in such examples.

Because the digital display of the matrix is easily changeable, and as mentioned, a particular scheme can be implemented randomly to attempt to avoid a frequency with which participants obtain unfavorable scores. Super Squares Games can offer clusters of score headings that can insure that at least 1 of the 4 Super Squares score combinations is statistically more favorable than average. Also, the rules of the Super Squares Game could require that either the interior Super Squares are jumbled once more each round, or, to ensure more variations, the audience of participants can select a new letter each round, which is then jumbled.

Each sport can manipulate score headings that statistically increase likelihood of securing at least one favorable combination of the four encapsulated by the participant's Super Square. By way of example, each cluster of score headings could include a high frequency occurring score, and a lower frequency occurring score, based on statistical averages. Note, too, that as Super Squares Games associated contests may be broken into discernible intervals (periods, "payoffs" or "rounds") with three to six intervals potentially be specified per contest or live event. As scores tend to increase with time, in early rounds, having lower digit combos are more favorable, where higher combos may be more valuable in later rounds (near the end of the underlying contest or sporting event, for example). This is particularly true of comparatively low scoring games like soccer, hockey and baseball (to an extent).

In embodiments, the score headings and assigned letter allocations may be permanently displayed, and a participant may be assigned a random letter (and therefore, the Super Square and its related score combinations). This provides a consistent and simple means by which to quickly illustrate and distribute Super Squares, without the need to illustrate the "jumbling" process of score headings or squares. This may distribute at least one favorable interior square per Super Square.

As an example, a recipient of a Hockey Super Square "M," may always receive the Home/Away score combinations of 2/2, 2/7, 7/2, and 7/7. Participants could therefore eventually become familiar with the score combinations linked to each letter.

The Super Squares Games may be sponsored by advertisers to (1) defray, avoid or supplement the cost of entry distribution, (2) advance logistics of hosting, registration, winner selection and participant notification, and/or (3) provide alternatives to monetary prize pools for non-monetary Super Squares Game implementations. Super Squares Game sponsors may provide advertising content that may be randomly interspersed with displays of the prize matrix at the sporting venue, or within a broadcast of the game. The advertisements may be made reactive in a manner that may be described for example in U.S. Pat. No. 6,606,745, the disclosure of which is hereby incorporated by reference herein in its entirety. Correctly responding to reactive queries may result in heightened attention (something every advertiser desires) and additional rewards to Super Squares game participants.

Particularly for large mass audiences (such as televised programs) where millions of viewers might be viewing, the heightened attention paid to ads that are associated with the Super Squares Game (denoted with an alert, mark or tone) may increase the value of an advertiser's advertisements, meriting a premium being paid by the advertiser. This premium may not only generate additional profits to the advertiser, sponsor, sports league, or broadcaster, but a portion of this premium might offset cost of conducting a mass Super Squares Game event. This cost might also include the cost of a significant prize (such as a car), or an insurance premium to cover the cost of offering massive grand prizes.

The public offer and promotion of the Super Squares game, and the offer of a valuable prizes (new cars, or significant prize pools) might increase live venue attendance and increased broadcast viewership of the sporting event (and therefore the audience for the advertisements). An increase in viewership and attention paid to the advertisements (measurable through the reactive advertising concept) may increase a value of an advertisement inventory, further increasing the revenues generated from the advertisements. This increased revenue stream can be partially diverted back into prizing, creating a positive feedback "loop" that increases prizes, then audience size, then prizes, and so on.

In one embodiment, attendees at live venues (or watching TV broadcasts) select a Super Square letter 4-6 times over the course of the event, and watch a reactive ad before each "shuffle," to qualify for a Super Square, if answered correctly. Failing to get the reactive question correct might result in the player only retaining one of the four squares (perhaps the least desirable one in the combo) or no squares at all. This single square solution may be referred to as a "mini-square."

Super Squares can be paired with skill-based and prognostication elements to allow for sponsors to charge to play the games, or, they can be entirely subsidized by the venue, sponsors, or networks. The skill-based or prognostication questions might add a tie-breaker element, or could be a final question that must be correctly answered to win a large prize. In embodiments, a "Jackpot Shot" question could ask, "What will be tonight's attendance," or "How many shots on goal will be made this evening?" This differentiator could be used as a "closest to the correct answer" tie-breaker, or may be required to match the result precisely to win a particularly valuable ("super") prize. Smaller prizes can be awarded each period/quarter/increment, with a super prize being awarded to a player who wins all 4-6 periods, and, optionally, the Jackpot Shot.

As part of participating digitally, a user at a venue may be required to provide their seat number and name when registering, allowing the host to contact participants (and to film them using onsite cameras), integrating the Super Squares game into the live event. Similarly, on-air hosts might have real time access to the participants and their ongoing entries, allowing them to be called or contacted on-air during the corresponding sporting event. This provides a real time, social media-friendly component to sporting events, which may be attractive to certain demographics The disclosed schemes may also provide matrix-based selections that are not "scores" based, or that do not require the provision of "scores-based" matrices, in multiple variations and schemes that may be optimized to particular sporting events.

A means of increasing the likelihood of winning for participants could include requiring a number of winning Super Squares over the course of an event, eliminating the requirement that winning Super Squares be consecutive from the first interval. By allowing the consecutive winning interval to commence from the first, second or third interval would increase the likelihood of a participant winning (though would make it impossible for a participant to achieve 5 consecutive winning Super Squares, of 6 intervals, should they be authorized to commence from the third interval).

The host could allow that the consecutive requirement be eliminated entirely; in such an example, the requirement may simply be, "Collect 4 or 5 winning Super Squares over the course of this event." Alternatively, the host could provide one or more "mulligans," or "do-overs" per event, such that, while the consecutive winning Super Square requirement may remain intact, a participant could receive, earn, or purchase a "mulligan" that could be electively utilized to convert a losing interval into a winning interval.

Another means of increasing the likelihood of winning would be to allow some or all participants to select their own Super Square combination in advance of an interval, such that participants with a thorough knowledge of the game might have an increased likelihood of selecting a winning combination. This "Pick Your Square" bonus could be awarded randomly (such as to those who are awarded the letter "Q"), or could be otherwise received, earned or purchased. For example, in a low scoring game like hockey, where scores are often 0-0 after the first period, selecting the Super Square containing a "0-0" combination would provide an increase in the number of winning Super Squares in that interval.

A host might also increase the likelihood of winning by further reducing the number of Super Squares. The host may elect, for example, to create only 5 Super Squares, in which a shape of each cluster of twenty combinations in a ten by ten matrix may deviate from a true "square" shape. The host might also add a "common zone" within the overall matrix that may be similar to the center square of a Bingo card, which is marked as filled for all participants. The host may, for example, purposefully allocate frequent or infrequent scores to the shared zone to further impact the frequency of winning Super Square combinations.

In embodiments, the disclosed schemes may be adaptable to sporting events where numbers are frequently used, but for other than traditional scores. For example, in many racing events, there are no "scores," merely finishing outcomes/orders (first, second, or third.) Numbers, however, are worn by players or event participants (such as in professional motor sports, like auto racing, in which the numbers are displayed on the cars/trucks/motorcycles).

By way of comparison, the "score headings" may be replaced with "driver/car numbers" and "Home" and "Away" might be replaced with "First Place" and "Second Place," for the event where Super Squares may be awarded at lap intervals. In such an implementation, for a 300 mile race, there may be Super Squares awarded every 50 laps, totaling 6 intervals. By way of example, at the 50 lap mark, the first place car might bear the number "17," and the second place car might bear the number "3," meaning that the holder of the Super Square "7,3" would have a winning Super Square.

A racing-inspired Super Square game could have applications to other forms of racing, including motocross, horse racing, and dog racing, and separately to non-racing events like jai alai and other sports where numbered event participants are ranked based upon their finish.

Finally, for events where finishes are ranked numerically, but where the event participants are not numbered visually (i.e. golf tournaments), a host could assign a number to each event participant in advance of the event (as in a golf tournament, where upwards of 100 golfers compete). So, in such an example, the top finishing golfer was assigned #42, and the second place finisher is golfer #2, the Super Square participant holding the "2,2" Super Square over a certain interval (i.e. after the first round, or first 9 holes) would be a winner.

The disclosed embodiments are intended to represent non-limiting examples of variations to the Super Squares games implementing the disclosed schemes in many variations and encompassing "scores-based" games, and variations that are associated with "non-scores-based" games. All of the above are non-limiting examples of potential implementations.

Figure 2:
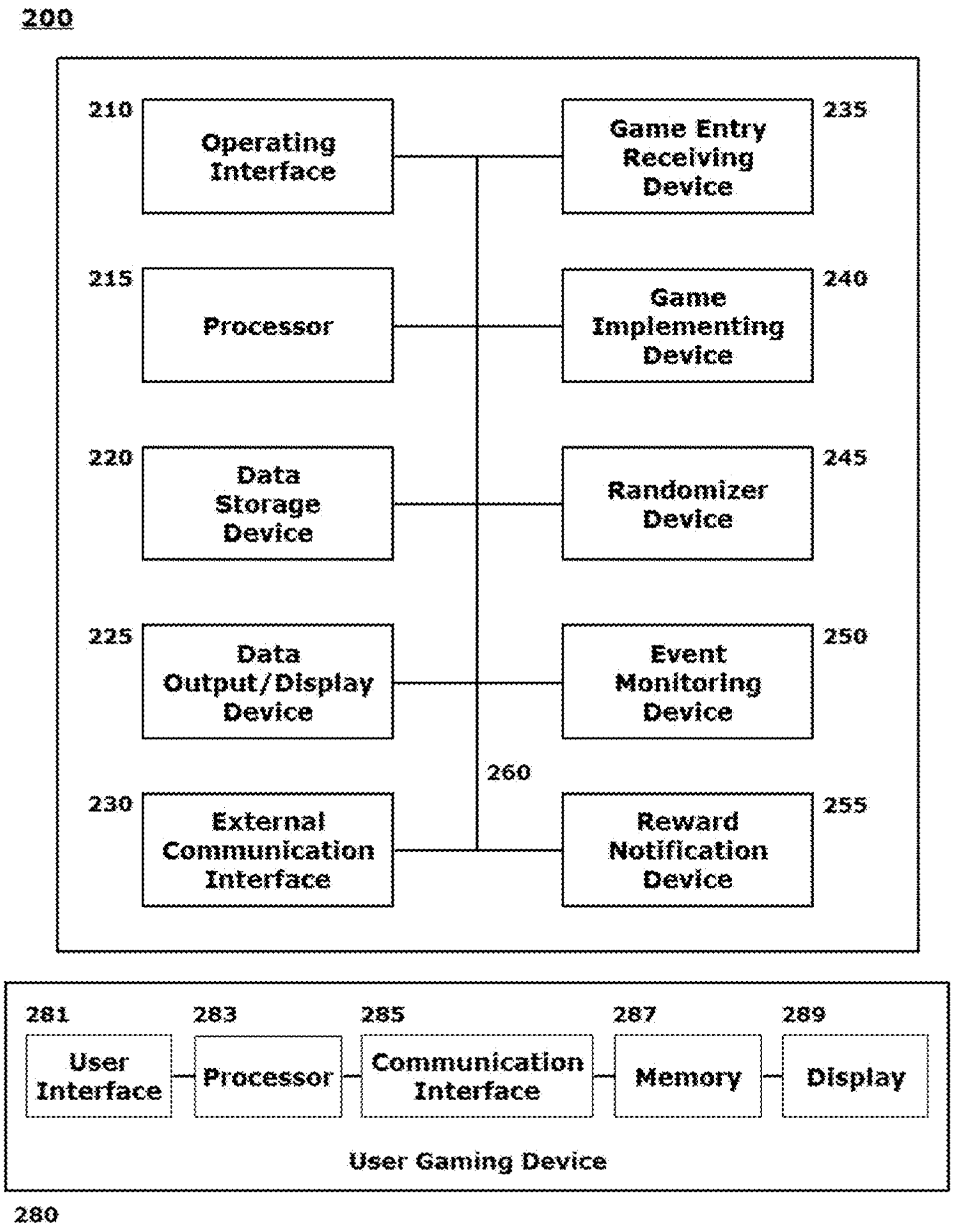
FIG. 2 illustrates a block diagram of an exemplary system for implementing an automated Squares Games according to this disclosure.

FIG. 2 illustrates a block diagram of an exemplary system 200 for implementing an automated Squares Games according to this disclosure.

The exemplary system 200 may include an operating interface 210 by which a user as a host may communicate with the exemplary system 200. The operating interface 210 may provide a host an opportunity initiate the automated Squares Game and to input any parameters appropriate to the conduct of the automated Squares Game. The operating interface 210 may be configured as one or more conventional mechanisms common to computing and/or communication devices that may permit the host to input information to the exemplary system 200. The operating interface 210 may include, for example, a conventional keyboard, a touchscreen with "soft" buttons or with various components for use with a compatible stylus, a microphone by which the host may provide oral commands to the exemplary system 200 to be "translated" by a voice recognition program, or other like device by which a user may communicate specific operating instructions to the exemplary system 200.

The exemplary system 200 may include one or more local processors 215 for individually operating the exemplary system 200 and for carrying into effect the disclosed schemes in the exemplary system 200. The processor 215 may carry out routines appropriate to operation of the exemplary system 200, and may undertake data manipulation and analysis functions appropriate to the game. Processor(s) 215 may include at least one conventional processor or microprocessor that interprets and executes instructions to direct specific functioning of the exemplary system 200, and control of the automated Squares Game implementation according to this disclosure.

The exemplary system 200 may include one or more data storage devices 220. Such data storage device(s) 220 may be used to store data or operating programs to be used by the exemplary system 200, and specifically the processor(s) 215 in carrying into effect the various participant interacting, game displaying and rewards notification functions of the disclosed Squares Game schemes. At least one of the data storage device(s) 220 may be used to store the gamification application and to temporarily store in-process Squares Game matrix display information. At least one of the data storage device(s) may be used to store particular identification information that may be collected incumbent to individual participants requesting to play the game. The data storage device(s) 220 may include a random access memory (RAM) or another type of dynamic storage device that is capable of storing updatable database information, and for separately storing instructions for execution of system operations by, for example, processor(s) 215. Data storage device(s) 220 may also include a read-only memory (ROM), which may include a conventional ROM device or another type of static storage device that stores static information and instructions for processor(s) 215. Further, the data storage device(s) 220 may be integral to the exemplary system 200, or may be provided external to, and in wired or wireless communication with, the exemplary system 200, including as cloud-based storage components.

The exemplary system 200 may include at least one data output/display device 225, which may be configured as one or more conventional mechanisms that output information to a user, in this case a host on a progress of the Squares Game. The data output/display device 225 may be used to indicate to the host information regarding a compilation of the matrix for a particular game, as well as a progress of a live event with which the Squares Game is associated. It is not necessary that the host monitor the actual conduct of the automated Squares Game by the exemplary system 200, but the host is afforded that option.

The exemplary system 200 may include one or more separate external communication interfaces 230 by which the exemplary system 200 may communicate with one or more offboard Squares game implementing components including, but not limited to an external display, and any user gaming device 280 on which a participant may choose to play the game, which may be in wired or wireless communication with the exemplary system 200.

The exemplary system 200 may include a game entry receiving device 235 that may be used to receive and store participant registration/identification information for individuals seeking to participate in a particular Squares Game. The prospective participant may have to identify the live event to the exemplary system 200 with which the prospective participant may choose the Squares Game to be associated. In addition to receiving prospective participant registration/identification information, the game entry receiving device 235 may be usable to interact with the user's gaming device 280 to a user selection of one or more of the plurality of squares in the game matrix for the particular Squares Game in which the user intends to participate. Participant selection of the one or more of the plurality of squares in the game matrix may be according to any of the above discussed methods.

The exemplary system 200 may include a game implementing device 240 that may execute functions for carrying into effect the Squares Game according to the disclosed schemes in the exemplary system 200. The game implementing device 2140 may itself be a function of the processor 215, or may exist in the exemplary system 200 as a stand-alone component.

The game implementing device 240 may accept input from the game entry receiving device 235 and the randomizer device 245, which may generate the random number schemes described above, to generate and monitor the status of the game matrix throughout the duration of the live event with which the Squares Game implemented by the exemplary system 200 is associated.

The exemplary system 200 may include an event monitoring device 250 that may be usable to monitor her progress of the live event with which the in-process Squares Game is associated. At prescribed intervals, the game implementing device 240 may receive inputs from the event monitoring device regarding, for example, a score, or other progress, of the live event and begin a determination scheme by which to determine whether any participant may be declared a winner for each specified interval in the live event.

The exemplary system 200 may include a reward notification device 255 by which, when a participant is determined to have won a prize, award, reward or the like, in the form of, for example, merchandise, discounts, coupons, cash and/or other incentives, the user may be immediately notified. Like the game implementing device 240 above, the reward notification device 255 may be a function of the processor 215, or a stand-alone device, either of which may present reward information user gaming device 280 to be displayed, for example, on a display 289 of the user gaming device 280.

The exemplary system 200 may communicate with one or more user gaming devices 280, each of which may themselves include user interface 281, processor 283, communication interface 285, a memory 287, and a display 289. The user as a participant in a Squares Game may employ a user gaming device 280 for interaction with the exemplary system 200 as it carries into effect the disclosed schemes for implementing the Squares Game. It should be noted that one or more of the user gaming devices 280 by which a user may participate in the Squares Game may be, in addition to the many device the catalog above, user-wearable devices such as, for example, wearable computer/communicating display glasses and/or watches, biometric sensors, virtual reality (or immersion) devices including goggles, helmets, tactile gloves and the like, and other known or developed wearable components for carrying out one or more of computing and/or communicating functions allowing user to communicate with the exemplary system 200.

All of the various components of the exemplary system 200, as depicted in FIG. 2, may be connected internally, and to one or more external components by one or more data/control busses 260. These data/control busses 260 may provide wired or wireless communication between the various components of the exemplary system 200, whether all of the components of the exemplary system 200 are housed integrally in, or are otherwise external and connected to the exemplary system 200.

It should be appreciated that, although depicted in FIG. 2 as an essentially integral unit, the various disclosed elements of the exemplary system 200 may be arranged in any combination of sub-systems as individual components or combinations of components, integral to a single unit, or external to, and in wired or wireless communication with the single unit of the exemplary system 200. Wireless communications may be by RF radio devices, optical interfaces, NFC devices and other wireless communicating devices according to RF, Wi-Fi, WiGig and other like communications protocols. In other words, no specific configuration as an integral unit, or as a support unit, is to be implied by the depiction in FIG. 2. Further, although depicted as individual units for ease of understanding of the details provided in this disclosure regarding the exemplary interface and control system 200, it should be understood that the described functions of any of the individually-depicted components may be undertaken, for example, by one or more processors 215 connected to, and in communication with, one or more data storage device(s) 220.

Figure 3:
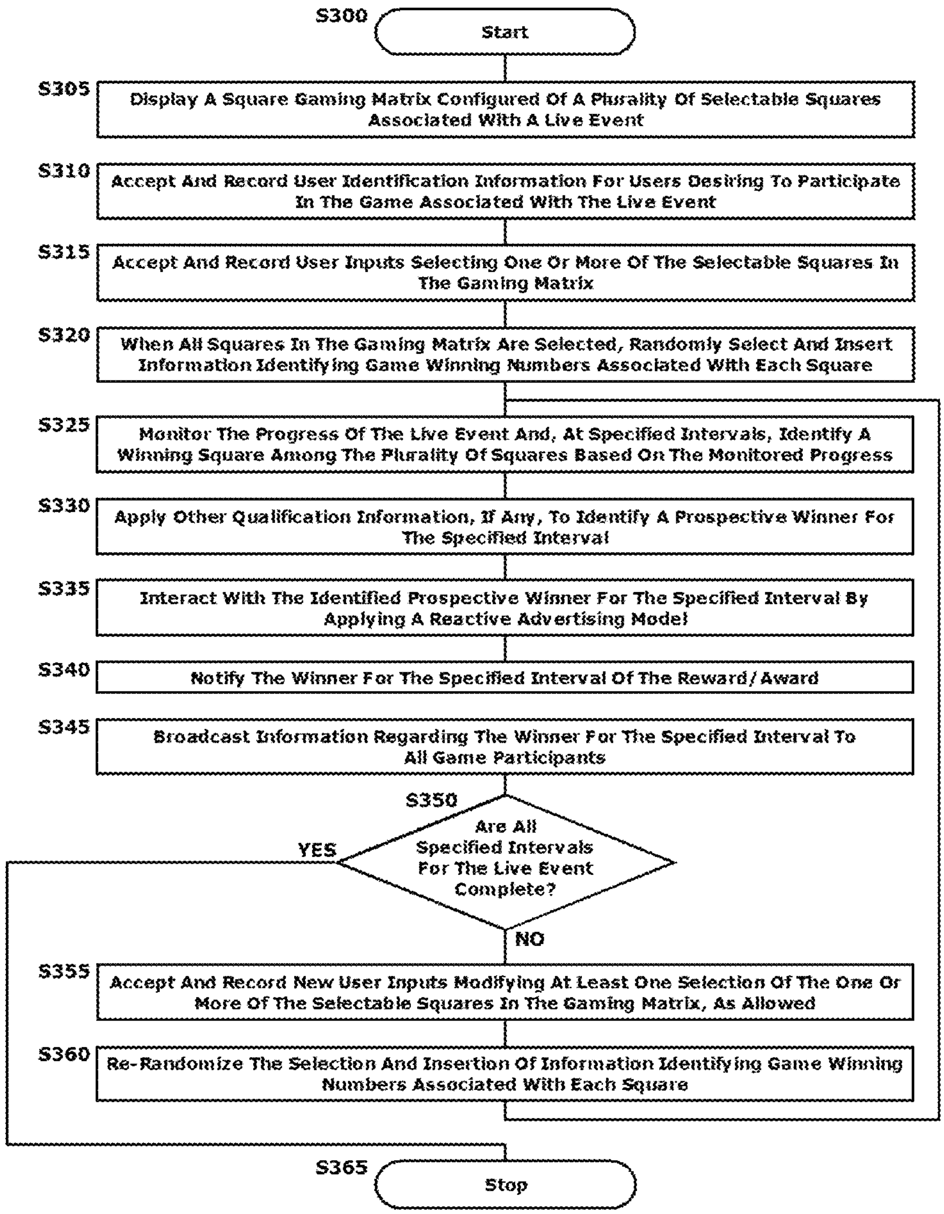
FIG. 3 illustrates a flowchart of an exemplary method for implementing an automated Squares Game according to this disclosure.

The disclosed embodiments may include an exemplary method for implementing an automated Squares Game. FIG. 3 illustrates a flowchart of such an exemplary method. As shown in FIG. 3, operation of the method commences at Step S300 and proceeds to Step S305.

In Step S305, a gaming matrix configured of a plurality of selectable squares associated with a live event may be automatically caused to be displayed. Operation of the method proceeds to Step S310.

In Step S310, user identification information for user desiring to participate in the game associated with the live event may be accepted and recorded. Operation of the method proceeds to Step S315.

In Step S315, user input selecting one or more of the selectable squares in the gaming matrix may be accepted and recorded. Operation of the method proceeds to Step S320.

In Step S320, when all of the squares in the gaming matrix are selected by, or otherwise identified as being associated with, a participant, information identifying game-winning numbers associated with each square may be randomly selected and inserted. This process may be automated to replicate the look and feel of a conventional matrix by randomly filling orders squares with selected numbers. Otherwise, the border numbers may be fixed and the individual participant-selected squares maybe randomized. Operation of the method proceeds to Step S325.

In Step S325, the progress of the live event may be monitored. At specified intervals, numbers associated with the live event may be extracted to identify a winning square foot at specified interval among the plurality of squares. This may be the only, or otherwise simply a first, step in identifying a winner of the Squares Game for the specified interval. Operation of the method proceeds to Step S330.

In Step S330, other qualification may be applied to identify prospective winner for the specified interval. This may include additional qualifying information, or additional random information according to one or more the schemes described in detail above. Operation of the method proceeds to Step S335.

In Step S335, a prospective winner may be presented with a reactive advertising scheme in which the perspective winner is presented with advertising content and then asked a series of questions regarding that advertising content. A prospective winner's ability to correctly answer questions based on the reviewed advertising content may be the last step in qualifying the perspective winner as the winner for the specified interval. Operation of the method proceeds to Step S340.

In Step S340, the winner for the specified interval may be notified of the reward or award that the winner has qualified for. Additional instructions may be provided, for example, to indicate to the winner how to redeem or otherwise collect the reward or award for which the winner has qualified. Operation of the method proceeds to Step S345.

In Step S345, information regarding the winner for the specified interval may be broadcast to all game participants. Operation the method proceeds to Step S350.

Step S350 is a determination step in which a determination is made as to whether all of the specified intervals associated with the particular live event that is being monitored as associated with the Squares Game are complete.

If, in Step S350, a determination is made that all of the specified intervals associated with a particular live event that is being monitors as associated with the Squares Game are complete, operation of the method proceeds to Step S365, where operation of the method ceases.

If, in Step S350, a determination is made that all of the specified intervals associated with a particular live event that is being monitors as associated with the Squares Game are not complete, operation of the method proceeds to Step S355.

In Step S355, the user inputs modifying at least one selection of the one or more of the selectable squares in the gaming matrix may be accepted and recorded, as allowed. Operation the method proceeds to Step S360.

In Step S360, the selection and insertion of information identifying game-winning numbers associated with each square may be re-randomized. Operation of the method reverts to Step S325.

The disclosed embodiments may include a non-transitory computer-readable medium storing instructions which, when executed by a processor may cause the processor to execute all, or at least some, of the steps of the method outlined above.

The above-described exemplary systems and methods reference certain conventional components to provide a brief, general description of suitable operating and presentation scheme implementing environments in which the subject matter of this disclosure may be undertaken for familiarity and ease of understanding. Although not required, embodiments of the disclosure may be provided, at least in part, in a form of hardware circuits, firmware, or software computer-executable instructions to carry out the specific functions described. These may include individual program modules executed by processors.

Those skilled in the art will appreciate that other embodiments of the disclosed subject matter may be practiced in myriad configurations for carrying into effect the disclosed Squares Game schemes with applications hosted on a broad spectrum of computing and communicating devices.

As indicated above, embodiments within the scope of this disclosure may include computer-readable media storing computer-executable instructions or data structures that can be read and executed by one or more processors for controlling the presentation processes for gaming matrices according to the disclosed schemes, and for carrying into effect the overall gaming schemes. Such computer-readable media can comprise RAM, ROM, EEPROM, CD-ROM, flash drives, data memory cards or other analog or digital data storage device that can be used to carry or store desired program elements or steps in the form of accessible computer-executable instructions or data structures.

Computer-executable instructions include, for example, non-transitory instructions and data that can be executed and accessed respectively to cause a processor, for example, in an automated squares game implementing device or system to perform certain of the above-specified data acquisition, game implementation, and display functions. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where a particular method step is a necessary precondition to execution of any other method step. Separately, not all of the depicted steps of the method shown in FIG. 3 need to be implemented in any particular embodiment.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

I claim:

1. A system for implementing an automated live event related game, comprising:

a display device for displaying information regarding a game matrix including a plurality of selectable gaming squares; and a gamification device that is configured to direct display of the game matrix on the display device including information defining each of the selectable gaming squares in the game matrix;

receive user selection of one or more of the selectable gaming squares transmitted from a user-controlled electronic device;

randomly select and insert information identifying numbers associated with each of the selectable gaming squares when the selectable gaming squares are selected;

direct display of a completed game matrix on the display device;

monitor the progress of a live event with which the game matrix is associated;

automatically obtain, with the processor, numbers indicative of the progress of the live event;

determine a prospective winner based on a comparison of the obtained numbers from the live event and identifying numbers associated with a particular selected gaming square;

apply additional winner verification criteria to each prospective winner to determine a winner, the additional winner verification criteria including applying a reactive scheme in which the each prospective winner is (1) presented with advertising content on the user-controlled electronic device, (2) presented with a series of queries regarding the advertising content, and (3) required to provide responses to the series of queries that will be evaluated by the gamification device to determine the winner; and direct notification of the determined winner by sending information to the user-controlled electronic device.

2. The system of claim 1, the user-controlled electronic device being one of a handheld computing or a handheld communicating device.

3. The system of claim 1, the user-controlled electronic device being a user-wearable input/output component.

4. The system of claim 1, the gamification device being further configured to receive, from the user-controlled electronic device, user identification information; and store the received user identification information in a storage device associated with the system.

5. The system of claim 1, the gamification device being further configured obtain the numbers indicative of the progress of the live event at specified intervals during the conduct of the live event, an interval winner being determined for each of the specified intervals.

6. The system of claim 5, the gamification device being further configured to at the completion of each of the specified intervals during the conduct of the live event, receive modified user selections of the one or more of the selectable game squares transmitted from the user-controlled electronic device; and modify the completed game matrix according to the receive modified user selections.

7. The system of claim 5, the gamification device being further configured to re-randomize the selection and insertion information identifying numbers associated with the each of the selectable gaming squares at the completion of each of the specified intervals during the conduct of the live event.

8. The system of claim 1, the gamification device being further configured to randomly select identifying numbers associated with a particular gaming square to identify an additional winner during the progress of the live event.

9. The system of claim 1, the gamification device being further configured to direct notification regarding an identity of the determined winner to the user-controlled electronic devices of all participants in the game.

10. The system of claim 1, the live event being a sporting event, and the obtained numbers indicative of the progress of the live event identify at least one of a score of the sporting event and an identification number of a participant in the sporting event.

11. A method for implementing an automated live event related game, comprising:

displaying information regarding a game matrix including a plurality of selectable gaming squares on a display device, the information including identification markings for defining each of the selectable gaming squares in the game matrix;

receiving, with a processor, a user selection of one or more of the selectable gaming squares transmitted from a user-controlled electronic device;

once the selectable gaming squares are all selected, randomly selecting and inserting, with the processor, information identifying numbers associated with each of the selectable gaming squares;

displaying a completed game matrix on the display device;

monitoring progress of a live event with which the game matrix is associated;

automatically obtaining, with the processor, numbers indicative of the progress of the live event;

determining, with the processor, a prospective winner based on a comparison of the obtained numbers from the live event and identifying numbers associated with a particular selected gaming square;

applying additional winner verification criteria to each prospective winner to determine a winner, the additional winner verification criteria including applying a reactive scheme in which the each prospective winner is (1) presented with advertising content on the user-controlled electronic device, (2) presented with a series of queries regarding the advertising content, and (3) required to provide responses to the series of queries that will be evaluated by the gamification device to determine the winner; and notifying the determined winner by sending information to the user-controlled electronic device.

12. The method of claim 11, the user-controlled electronic device being at least one of a handheld computing, a handheld communicating device, and a user-wearable input/output component.

13. The method of claim 11, further comprising:

receiving, with the processor from the user-controlled electronic device, user identification information; and storing the received user identification information in a data storage device.

14. The method of claim 11, further comprising:

obtaining the numbers indicative of the progress of the live event at specified intervals during the conduct of the live event, an interval winner being determined for each of the specified intervals;

at the completion of each of the specified intervals during the conduct of the live event, receiving modified user selections of the one or more of the selectable game squares transmitted from the user-controlled electronic device;

re-randomizing, with the processor, the selection and insertion information identifying numbers associated with the each of the selectable gaming squares at the completion of each of the specified intervals during the conduct of the live event; and modifying the completed game matrix according to the receive modified user selections and the re-randomizing to produce a modified completed game matrix for a next one of the specified intervals.

15. The method of claim 11, further comprising directing notification regarding an identity of the determined winner to the user-controlled electronic devices of all participants in the game.

16. A non-transitory computer-readable data storage medium storing instructions that, when executed by a processor, cause the processor to execute the steps of a method for implementing an automated live event related game, comprising:

displaying information regarding a game matrix including a plurality of selectable gaming squares on a display device, the information including identification markings for defining each of the selectable gaming squares in the game matrix;

receiving a user selection of one or more of the selectable gaming squares transmitted from a user-controlled electronic device;

once the selectable gaming squares are all selected, randomly selecting and inserting information identifying numbers associated with each of the selectable gaming squares;

displaying a completed game matrix on the display device;

monitoring progress of a live event with which the game matrix is associated;

automatically obtaining numbers indicative of the progress of the live event;

determining a prospective winner based on a comparison of the obtained numbers from the live event and identifying numbers associated with a particular selected gaming square;

applying additional winner verification criteria to each prospective winner to determine a winner, the additional winner verification criteria including applying a reactive scheme in which the each prospective winner is (1) presented with advertising content on the user-controlled electronic device, (2) presented with a series of queries regarding the advertising content, and (3) required to provide responses to the series of queries that will be evaluated by the gamification device to determine the winner; and notifying the determined winner by sending information to the user-controlled electronic device.

* * * * *